US010862898B2

(12) United States Patent
Hecker et al.

(10) Patent No.: US 10,862,898 B2
(45) Date of Patent: Dec. 8, 2020

(54) POLYMORPHIC NETWORK INTERFACE (71) Applicant: NCR Corporation, Duluth, GA (US)

(72) Inventors: Weston Lee Hecker, Bismarck, ND (US); Shelley Jackson, Monifieth (GB); Curtis Charles Menmuir, Dundee (GB); Anthony Edward Roper, Dundee (GB)

(73) Assignee: NCR Corporation, Atlanta, GA (US)

( * ) Notice: Subject to any disclaimer, the term of this patent is extended or adjusted under 35 U.S.C. 154(b) by 261 days.

(21) Appl. No.: 15/993,428

(22) Filed: May 30, 2018

(65) Prior Publication Data

US 2019/0372992 A1 Dec. 5, 2019

(51) Int. Cl.
*H04L 29/06* (2006.01)
*H04L 29/12* (2006.01)
*H04L 12/54* (2013.01)

(52) U.S. Cl.
CPC ........ *H04L 63/108* (2013.01); *H04L 12/5601* (2013.01); *H04L 61/2007* (2013.01); *H04L 61/2038* (2013.01); *H04L 63/1441* (2013.01); *H04L 61/2514* (2013.01)

(58) Field of Classification Search
CPC ............... H04L 63/108; H04L 61/2007; H04L 12/5601; H04L 63/1441; H04L 61/2514; H04L 61/2038
See application file for complete search history.

(56) References Cited

U.S. PATENT DOCUMENTS

| 5,910,956 | A  | * | 6/1999 | Guthrie | G06F 7/584 |
| | | | | | 370/445 |
| 8,213,589 | B1 | * | 7/2012 | Martin | H04L 63/1441 |
| | | | | | 379/201.11 |
| 2003/0177249 | A1 | * | 9/2003 | Takanashi | H04L 61/2015 |
| | | | | | 709/229 |
| 2004/0128387 | A1 | * | 7/2004 | Chin | H04W 74/08 |
| | | | | | 709/227 |
| 2008/0104243 | A1 | * | 5/2008 | Roscoe | H04L 29/12254 |
| | | | | | 709/226 |
| 2009/0024758 | A1 | * | 1/2009 | Levy-Abegnoli | H04L 45/745 |
| | | | | | 709/237 |
| 2010/0189029 | A1 | * | 7/2010 | Jing | H04L 29/1232 |
| | | | | | 370/328 |
| 2012/0227091 | A1 | * | 9/2012 | Smith | H04L 45/24 |
| | | | | | 726/4 |

(Continued)

OTHER PUBLICATIONS

Jafarian et al., Openflow Random Host Mutation: Transparent Moving Target Defense using Software Defined Networking, Aug. 13, 2012, ACM 978-1-4503-1477, pp. 127-132.*

(Continued)

*Primary Examiner* — Robert B Leung
*Assistant Examiner* — Thomas Ho
(74) *Attorney, Agent, or Firm* — Schwegman, Lundberg & Woessner (57) ABSTRACT

An address for a protected resource of a device is randomized at configurable intervals of time as a randomized address. The randomized address is pushed to the Operation System (OS) for mapping the randomized address to an OS identifier for the protected resource. Other devices of a network produce a same randomized address for the protected resource based on a time-based synchronization.

9 Claims, 4 Drawing Sheets

(56) References Cited

U.S. PATENT DOCUMENTS

| | | | | |
|---|---|---|---|---|
| 2013/0294262 A1* | 11/2013 | Jose | ............... | H04W 72/02 370/252 |
| 2015/0040238 A1* | 2/2015 | Sarsa Sarsa | ............ | G06F 21/60 726/26 |
| 2015/0350188 A1* | 12/2015 | Gilpin | ............... | G06F 21/33 726/9 |
| 2017/0195295 A1* | 7/2017 | Tatlicioglu | ............... | H04L 45/74 |
| 2018/0159701 A1* | 6/2018 | Krause | ............... | H04L 61/2521 |
| 2019/0095236 A1* | 3/2019 | Felter | ............... | H04L 69/30 |
| 2020/0084222 A1* | 3/2020 | William | ............... | H04L 9/0869 |

OTHER PUBLICATIONS

El-Shaer et al., Random Host Mutation for Moving Target Defense, LNICST 2013, p. 310-327.*

* cited by examiner

POLYMORPHIC NETWORK INTERFACE

BACKGROUND

Security and resilience of Automated Teller Machines (ATMs—one type of a Self-Service Terminal) to attacks and common issues can lead to breaches in the security integrity of: the ATMs, the ATM network, and user account information. Nefarious individuals and even well-funded and equipped state actors are continuously trying to breach and attack ATMs, users' account information, and financial systems interfaced to the ATMs.

There are several current attacks that require attackers to find the interface of the ATM through the network connections of the ATM. Attackers are able to scan networks to discover Internet Protocol (IP) addresses, which can result in the ATM being compromised and subjected to hacking.

Another way hackers discover IP addresses is through connection of a Universal Serial Bus (USB) device having a program to monitor, discover, and remotely report or post the discovered IP addresses to a remote and/or anonymized site location.

Once the IP address to secure resources of the ATM are known, attacks and malicious activity becomes a lot easier for the hackers and more difficult to stop or thwart by the financial institutions.

SUMMARY

In various embodiments, methods and a system for polymorphic network interface processing are presented.

According to an embodiment, a method for polymorphic network interface processing is presented. Specifically, and in one embodiment, a network address for a resource is randomly generated within a predefined range of available network addresses at predefined periods of time producing a current network address for the resource. The current network address is pushed to a network interface of a device that includes the protected resource. The network interface provides any network traffic directed over a network to the device at the current network address to the resource.

DETAILED DESCRIPTION

Figure 1:
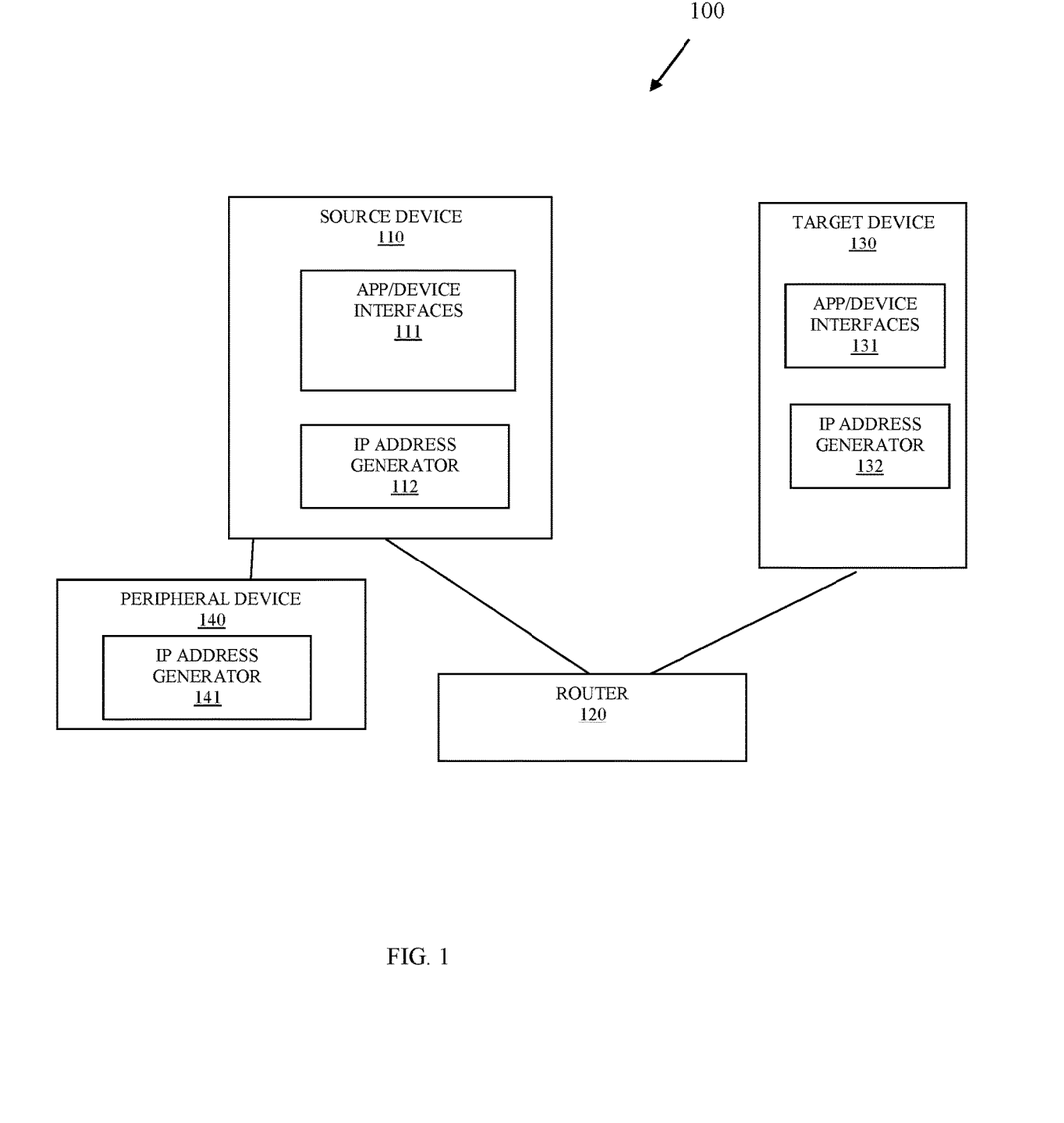
FIG. 1 is a diagram of a system for polymorphic network interface processing, according to an example embodiment.

FIG. 1 is a diagram of a system 100 for polymorphic network interface processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of polymorphic network interface processing techniques, presented herein and below.

The system 100 includes a source device 110 having protected app/device interfaces 111 and an IP address generator 112. The system 100 further includes at least one connected router 120, and at least one target device 130 having app/device interfaces 131 and an IP address generator 132.

Conventionally, devices are locally assigned an IP address within that devices local domain. For example, a client device connected to a local router is assigned a unique network address within the domain of the local router, such as "192.168.1.1." Within a local client, a socket address is assigned to resources of the client. The socket address is a combination of the client IP address and a port number that allows the network protocol to properly route network communications within the client to specific client resources. An example, socket address may appear as follows for an application that processes on the client, "192.168.1.1:8080." The local router is responsible for assigning the local device IP address and port number assignment. The IP address and port number assignment are unique per resource. The socket address allows resources that are unique to a client to be reached directly over a network connection. The local router maintains a mapping to the client devices and their unique IP address, the assignment of the IP address to local devices can be static or dynamic.

Largely because of the proliferation of unique devices available on the Internet, a new version of IP was developed because unique IP addresses were rapidly running out or reaching saturation. This new version was version 6, referred to as IPv6. IPv4 (IP version 4) utilized a 32 bit numeric address assignment as four numbers separated by periods and in decimal (0-9). IPv6 utilize 128 bit hexadecimal (0-9 and A-F) separated by colons (an example IPv6 address may appear as follows for a client device: 2001:0db8:85a3:0000:0000:8a2e:0370:7334"). Therefore, IPv6 provides a much larger address space and also provides increased native security support over previous versions of IP, such as IPv4. IPv4 provides unique addresses for $2^{32}$ whereas IPv6 provides unique addresses for $2^{128}$.

The IP address generator 112 and 132 generates an almost completely unique IPv6 address range compliant with RFC4193. RF4193 requires these IPv6 address ranges to be generated using a RFC4086 compliant random number generator. Such addresses are not currently expected to be routable over the global Internet. That means that a portion of the IPv6 address is available for usage locally at the local routers for each domain. The local available addressing combinations permits trillions of possible IP addresses to be formulated locally within a given domain (subnet). So, as an example, if the router 120 is assigned a unique IPv6 globally accessible IP address, the subnet managed by the router 120 is a 48 bit IPv6 address available within that globally accessible IP address.

The IP address generator 112 and 132 includes a complaint random IPv6 subnet address generator that is seeded with a key on initiation. The IPv6 subnet address generator is configured to regenerate a new random subnet address for each protected app/device interface at predefined intervals, for example every 15 minutes. Any interval of time can be configured in the subnet address generator.

Upon initiation to place the source and target devices 110 and 130 in synchronization with one another, the seed value supplied to the IP address generator 112 is provided to the IP address generator 132. This places the two IP address generators 112 and 132 in synchronization with one another based on time of day and calendar day.

When a particular IP address for a given protected app/device interface 111 or 131 is changed, the changed address is broadcasted or reported to the router 120, which records the changed address for that app/device interface 111 of 131, ensuring that the router 120 has the proper routing tables to deliver communications to the appropriate app/device interface 111 or 131. That is, the router 120 listens on ports of the devices 110 and 130 for address assignment changes being broadcasted over the ports and makes the noted changes in the routing tables.

Should a device 110 or 130 be compromised or the router 120 be compromised, the hacker will only have a valid IP address for a very short period of time after which the obtained IP address changes automatically for a given app/device interface 111 and 131. This limits the hacker's ability to take action to a small period of time and will likely thwart most hacking activities that rely on remote IP address reporting for subsequent directed hacks. The likelihood that a used randomly generated IP address is repeated or becomes non-unique is extremely low and borders are impossibility given the 48 bit available range utilizing hexadecimal character sets.

Moreover, the actual app/device interfaces 111 and 131 do not require any changes for the system 100 to process. The IP address generator 112 can be installed as a small kernel-based operating system (OS) process that processes the IP address random generator for each app/device interface 111 and 131. The router 120 also requires no changes and can function normally.

In an embodiment, the IP address generator 112 and 132 are provided as software libraries accessible within the OS of the devices 110 and 130.

In an embodiment, the IP address generator 141 is provided as a kernel-based virtual machine (VM-KVM) to the source device 110 and the target device 130 and installed as an input device driver (mouse, screen, and keyboard). The KVM is also a physical device 140 running as a KVM that provides the random address assignments. In an embodiment, the physical device performs Network Address Translation (NAT) processing for IPv4 address as well as for IPv6. The hardware-based embodiment for the IP address generator 141, discovers IP addresses and/or IP address and port assignment pairs on the device 110 or 130 to which it is connected (such as through a USB port), randomizes the addresses and the address-port pairs to an IPv6 subnet unique address and bounces the changed addresses and address-port pairs back to the OS and network stack of the device 110 or 130 to which the hardware device is connected. The randomized address are then broadcasted or obtained by the router 120 for normal publication, such that the router 120 is equipped to identify the randomized addresses.

In an embodiment, the IP address generator 141 includes a remotely-accessible interface for providing the seed value to the IP address random generator through the KVM. The KVM is its own separate VM that does not run in the address space of the main processing environment of the devices 110 and 130, such that when it is accessed there is no security threat or interference with the processing of the app/device interfaces 111 and 131.

In an embodiment, the device ports and external Internet access is severed for the devices 110 and 130, communication to the app/device interfaces 111 and 131 is direct through the IPv6 address assignment. This reduces and nearly eliminates the available attack surfaces of the devices 110 and 130; the new attack surface is the trillions of available subnet addresses available in the subnet addressing space, for which a hacker is extremely unlikely to find any specific app/device interface address.

In an embodiment, no keys are shared between the devices 110 and 130 and the router 120; the random seed is just supplied to the devices 110 and 130 and is manually entered as a configuration parameter through an interface to the IP address generator 112 and 132 when the IP address generator 112 and 132 is initiated for processing; random IP address generation is time synchronized (time of day and calendar day) ensuring synchronization between the devices 110 and 130 and the router 120.

The pairing between two app/device interfaces 111 and 112 is based on the assigned IP addresses for the app/device interfaces 111 and 112, which is random and based on the initial seed value and time synchronized (both devices 110 and 130 executing the same IP random address generator algorithm within the IP address generator 112 and 132 initialized with a same seed value and time synchronized). The existing OS and network stack processing on the devices 110 and 130 maintains mappings between process identifiers assigned by the OS to the app/device interfaces 111 and 112 and the port numbers or subnet addresses, such that the randomized IP addresses are pushed by the IP address generator 112 and 132 to the OS and the network stack updated accordingly to have the process identifiers match the randomized addresses.

In an embodiment, the hardware based solution includes a Network Interface Card (NIC) modification that executes in its firmware the IP address generator 141. The NIC replaces an existing NIC card on the devices 110 and 130.

In an embodiment, the device 110 is a client device and the device 130 is a server device arranged in a client-server architecture through network connections to the router 120.

In an embodiment, the device 110 is an Automated Teller Machine (ATM) and the device 130 is a backend financial institution server.

In an embodiment, the system 100 includes a plurality of other devices that execute a version or an instance of the IP address generator 112, 132, or 141, and the system 100 includes a plurality of routers.

In an embodiment, connections to the router 120 can be wireless, wired, or a combination of both wired and wireless.

In an embodiment, the device 110 or 130 is one of: a laptop, a desktop, a tablet, a phone, a wearable processing device, a Self-Service Terminal (SST), a Point-of-Sale (POS) terminal, and an Internet-of-Things (IoT) networked-enabled device.

In an embodiment, the app/device interface 111 or 131 is a resource within the processing environments of the devices 110 and 130 that is a protected resource made available for network communication from the processing environments.

In an embodiment, the protected resource is one of: a peripheral device, an application that processes on the devices 110 and 130, and a file. The protected resource is accessible over the network originally through a device IP address and port assignment pair and is changed to be accessible herein through an IPv6 randomly generated subnet address. No changes are needed to the protected resource, as changes to the process identifier or file identifier are achieved through the IP address generators 112 and 132 and its communication to the OS process manager and/or network stack that reports the changed mappings between the process/file identifiers and port assignments to be the randomized Ipv6 addresses. Furthermore, no changes are needed to the OS process manager and/or network stack processing other than providing a configuration for these processes to handle IPv6 addresses, which most OSs and network stack processing supports.

The system 100 provides a polymorphic network interface to the devices 110 and 130 of a network by randomly changing resource IP addresses and/or IP and port assignment pairs at predefined and configurable intervals of time as discussed above. The ever changing IP randomly generated IP addresses for the resources reduce hacking capabilities and provides for more security of the resources (app/device interfaces 111 and 131) over networks by reducing a time during which a valid IP address is usable to access a protected resource.

These and other embodiments are now discussed with reference to the FIGS. 2-4.

Figure 2:
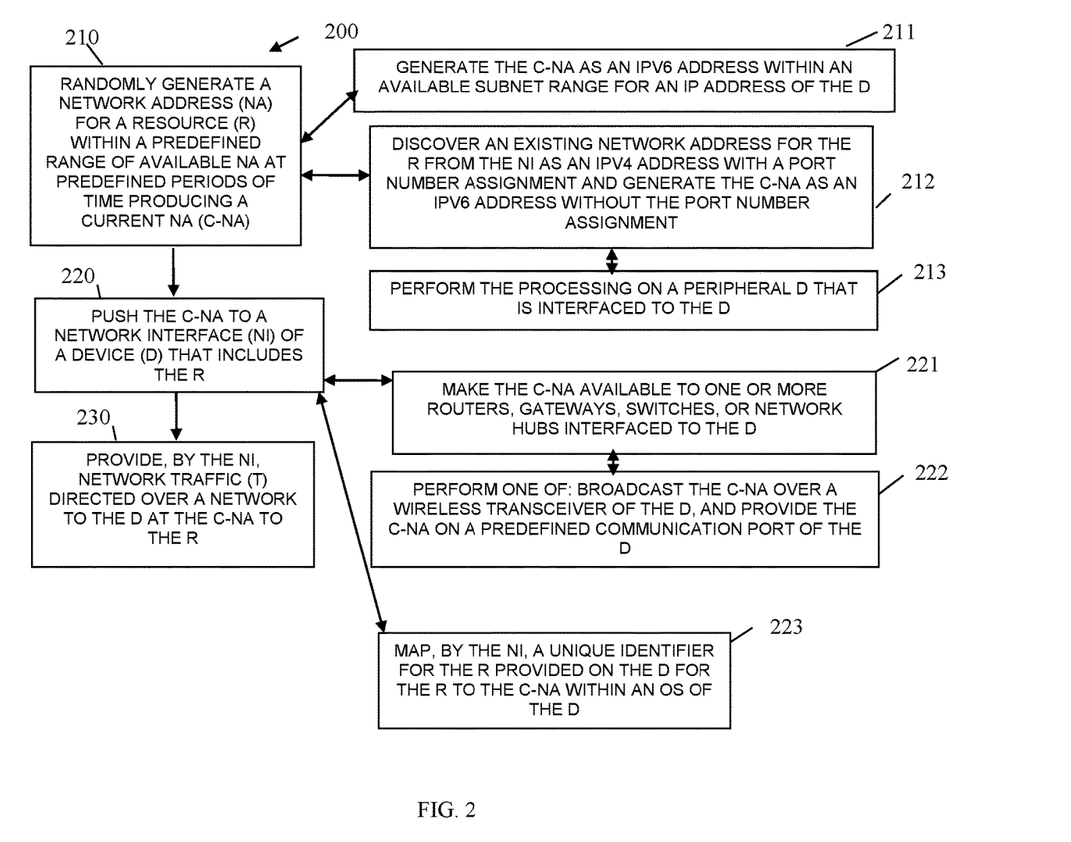
FIG. 2 is a diagram of a method for polymorphic network interface processing, according to an example embodiment.

FIG. 2 is a diagram of a method 200 for polymorphic network interface processing, according to an example embodiment. The software module(s) that implements the method 200 is referred to as a "polymorphic network interface." The polymorphic network interface is implemented as executable instructions programmed and residing within memory and/or a non-transitory computer-readable (processor-readable) storage medium and executed by one or more hardware processors of a device. The hardware processor(s) of the device that executes the polymorphic network interface are specifically configured and programmed to process the polymorphic network interface. The dual core switcher has access to one or more network connections during its processing. The network connections can be wired, wireless, or a combination of wired and wireless.

In an embodiment, the device that executes the polymorphic network interface is the device 110 or 130. In an embodiment, the device 110 is one of: a SST, an ATM, a kiosk, and a POS terminal. In an embodiment, the device 130 is a server.

In an embodiment the device that executes the polymorphic network interface is one of: a laptop, a desktop, a wearable processing device, a tablet, a phone, and an IoT network-enabled device In an embodiment, the device that executes the polymorphic network interface is a peripheral device interfaced to a host device. In an embodiment, the peripheral device is the peripheral device 140. In an embodiment, the peripheral device 140 is a USB device. In an embodiment, the peripheral device 140 is a NIC for the host device 110.

In an embodiment, the polymorphic network interface an executing instance of the IP address generator 112, 132 or 141.

At 210, the polymorphic network interface randomly generates a network address for a resource within a predefined range of available network addresses at predefined periods of time producing a current network address that is needed for network communication with the resource.

In an embodiment, the resource is one of: an application processing on a host device, a peripheral device interfaced to the host device, and a secure file or secure storage location of the host device.

In an embodiment, at 211, the polymorphic network interface generates the current network address as an IPv6 compliant address within an available subnet range of available addressing space for an IP address of the host device.

As used herein, the "host device" is the device that controls access to the resource and makes the resource accessible over a network connection.

In an embodiment, at 212, the polymorphic network interface discovers an existing network address for the resource from the network interface as an IPv4 address with a port number assignment and generates the current network address as an IPv6 address without the port number assignment.

In an embodiment of 212 and at 213, the polymorphic network interface performs the processing of the method 200 on a peripheral device that is interfaced to the host device. In an embodiment, the peripheral device is a USB device. In an embodiment, the peripheral device is a NIC of the host device.

At 220, the polymorphic network interface pushes the current network address to a network interface of the host device. Again, the host device includes the resource.

In an embodiment, at 221, the network interface makes the current network address available to one or more routers, gateways, network switches, or network hubs that are interfaced to the host device.

In an embodiment of 221 and at 222, the network interface performs one of: broadcasting the current network address over a wireless transceiver of the host device and providing the current network address on a predefined communication port of the host device monitored by the routers, gateways, network switches, and network hubs.

In an embodiment, at 223, the network interface maps a unique identifier for the resource that is provided on the host device to the current network address within an OS of the host device. That is, the mechanism for intra-device routing is updated to link the current network address to the device-specific identifier for the resource.

At 230, the network interface provides network traffic directed over a network to the device at the current network address to the resource for processing by the resource.

Again, the polymorphic network interface iterates the processing 210-230 at the predefined intervals of time, each iteration including a new current network address for the resource.

It is also to be noted that each device of the network that has security rights to communicate with the resource executes its own independent instance of the polymorphic network interface, such that each such device can properly pair and communicate with the resource over the network using the current network address. Each instance of the polymorphic network interface time and seed value synchronized and processing a same randomizer, such that each device has the current network address for the resource.

Figure 3:
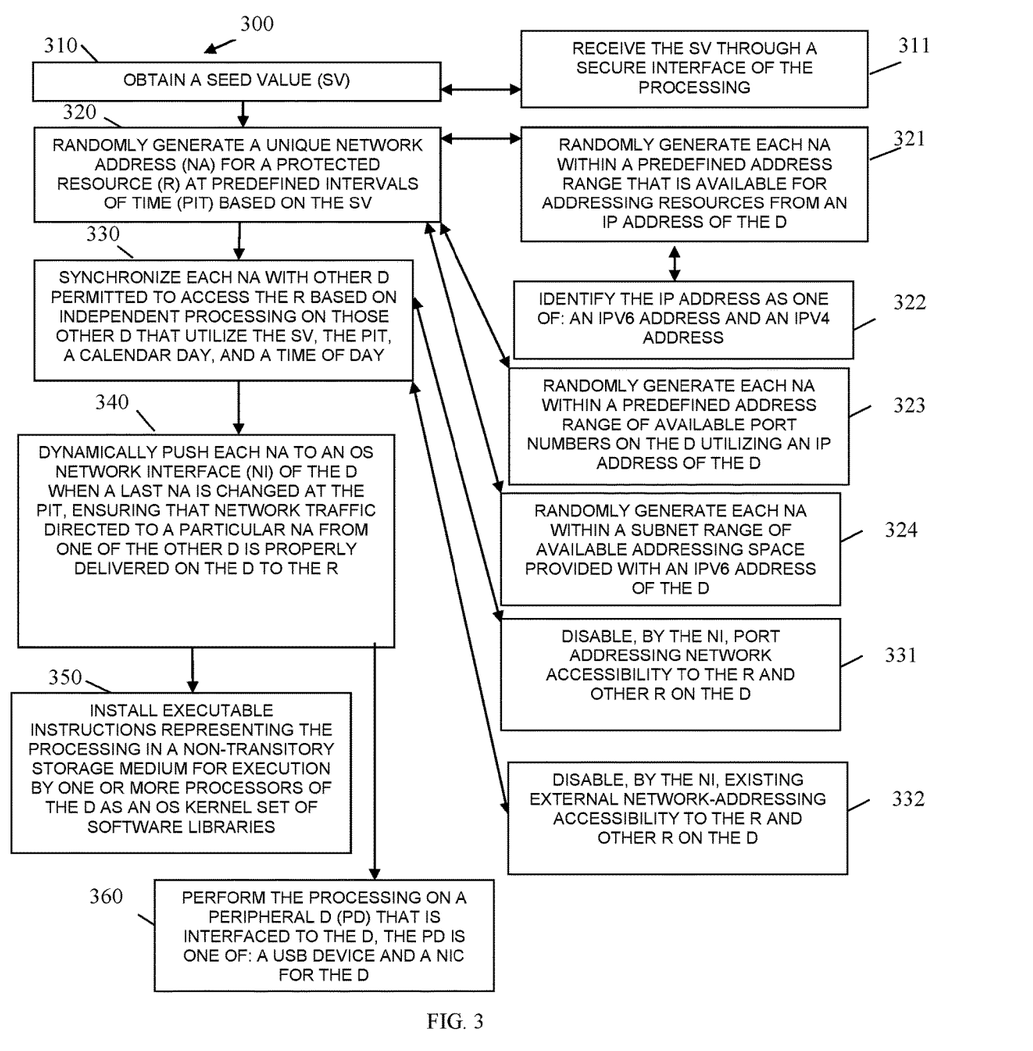
FIG. 3 is a diagram of another method for polymorphic network interface processing, according to an example embodiment.

FIG. 3 is a diagram of another method 300 for polymorphic network interface processing, according to an example embodiment. The software module(s) that implements the method 300 is referred to as a "network interface manager." The network interface manager is implemented as executable instructions programmed and residing within memory and/or a non-transitory computer-readable (processor-readable) storage medium and executed by one or more hardware processors of a device. The hardware processors that execute the network interface manager are specifically configured and programmed to process the network interface manager. The network interface manager has access to one or more network connections during its processing. The network connections can be wired, wireless, or a combination of wired and wireless.

In an embodiment, the device that executes the network interface manager is the device 110 or 130. In an embodiment, the device 110 is one of: a SST, an ATM, a kiosk, and a POS terminal. In an embodiment, the device 130 is a server.

In an embodiment the device that executes the network interface manager is one of: a laptop, a desktop, a wearable processing device, a tablet, a phone, and an IoT network-enabled device.

In an embodiment, the device that executes the network interface manager is a peripheral device interfaced to a host device. In an embodiment, the peripheral device is the peripheral device 140. In an embodiment, the peripheral device 140 is a USB device. In an embodiment, the peripheral device 140 is a NIC for the host device 110.

In an embodiment, the network interface manager is an executing instance of the IP address generator 112, 132 or 141; and/or the method 200.

The network interface manager presents another and in some ways enhanced processing perspective of the method 200.

At 310, the network interface manager obtains a seed value.

In an embodiment, at 311, the network interface manager receives the seed value through a secure interface of the network interface manager.

At 320, the network interface manager randomly generates a unique network address for a protected resource at predefined intervals of time based on the initial supplied seed value.

In an embodiment, at 321, the network interface manager randomly generates each unique network address within a predefined address range that is available for addressing resources from within and as a part of an IP address for the host device (device controlling access to the protected resource over the network).

In an embodiment of 321 and at 322, the network interface manager identifies the IP address for the host device as one of: an IPv6 address and an IPv4 address. Note that in some embodiments of the invention can maintain IPv4 addressing schemes if a particular application requires IPv4 addressing.

In an embodiment, at 323, the network interface manager randomly generates each unique network address within a predefined address range of available port numbers utilizing an IP address of the host device. Note that in some embodiments of the invention existing appended port numbers to the IP address of the device for reaching the resource can be maintained if a particular application requires such port number assignments. Here, the port numbers are randomized by the network interface manager.

In an embodiment, at 324, the network interface manager randomly generates each unique network address within a subnet range of available addressing space provided with an IPv6 address for the device. This embodiment was discussed at length above with the FIG. 1.

At 330, the network interface manager synchronizes each unique network address for reaching the protected resource with other devices that are permitted to access the resource over a network connection. Each of the other devices perform their own independent processing utilizing a same randomizer as the network interface manager; the randomizers producing at any given point in time a same unique network address for the protected resource based on being provided (during setup) the same seed value obtained at 310, the same predefined interval of time, a current calendar day, and a current time of day. So, the host device and the other devices do not have to communicate in any manner with one another and do not have to exchange or maintain any keys; rather, each device includes a same randomizer and is initially configured with the same seed value.

In an embodiment, at 331, the network interface manager disables port addressing network accessibility to the protected resource and other resources on the device. That is, the randomized and polymorphic (changing) network address processing performed by the network interface manager replaces the existing port-based network addressing. This also reduces the possibility of hacking by eliminating guessing port assignments for the resource when the IP address for the host device has been compromised by a hacker.

In an embodiment, at 332, the network interface manager disables existing external network-addressing accessibility to the resource and other resources on the device. The network interface manager processing replacing those existing network-addressing processing mechanisms. Again, this reduces the hacking capabilities of the resource by a hacker when the IP address for the host device has been compromised by that hacker.

At 340, the network interface manager dynamically pushes each unique network address to an OS network interface of the host device when a last unique network address is changed at the predefined interval of time. This ensures that network traffic directed to a particular network address from one of the other devices of the network is properly delivered on the device (intra-device routing) to the protected resource.

According to an embodiment, at 350, executable instructions representing the network interface manager are installed during initial setup in a non-transitory computer-readable storage medium for execution by one or more processors of the host device as an OS-kernel set of software libraries.

In another embodiment, at 360, the executable instructions representing the network interface manager are processed on one or more processors of a peripheral device that is interfaced to the host device. In an embodiment, the peripheral device is a USB device. In an embodiment, the peripheral device is a NIC for the host device.

Again, it is noted that each device that is permitted to access the protected resource of the host device executes an instance of the network interface manager, such that a current network address for the protected resource is maintained in synchronization between the network devices, and routers discover the current network address through router discovery and publication mechanisms as discussed above.

Figure 4:
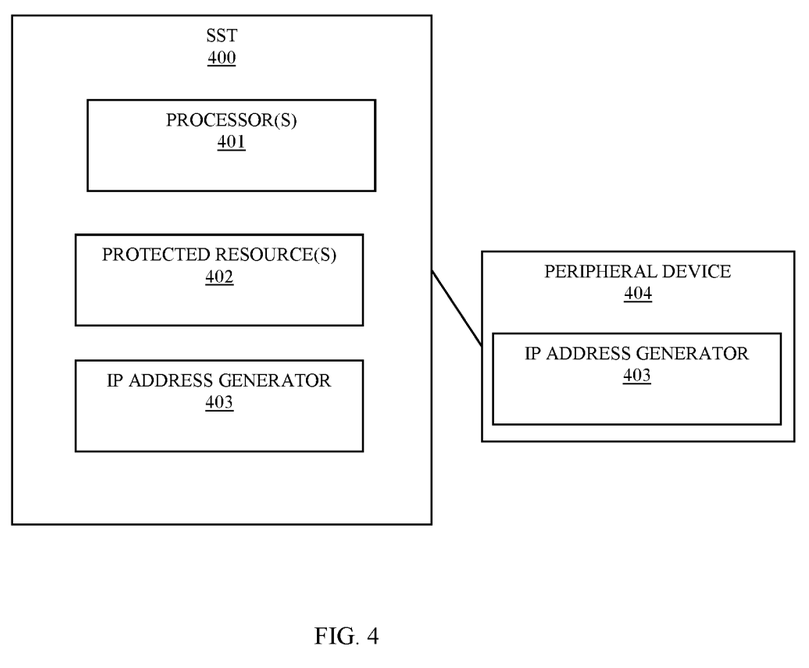
FIG. 4 is a diagram of a Self-Service Terminal (SST) for polymorphic network interface processing, according to an example embodiment.

FIG. 4 is a diagram of a SST 400 for polymorphic network interface processing, according to an example embodiment. The SST 400 includes a variety of hard ware components and software components. The software components of the SST 400 are programmed and reside within memory and/or a non-transitory computer-readable medium and execute on one or more hardware processors of the SST 400. The SST 400 communicates over one or more networks, which can be wired, wireless, or a combination of wired and wireless.

In an embodiment, the SST 400 implements, inter alia, the processing described above with the FIGS. 1-3.

The SST 400 includes at least one processor 401, a protected resource 402, and an IP address generator 403.

In an embodiment, the IP address generator 403 is executed on the processors 401 of the SST 400.

In an embodiment, the SST 400 includes an integrated or interfaced peripheral device 404 that includes one or more processors that execute the IP address generator 403. In an embodiment, the peripheral device 404 is a NIC. In an embodiment, the peripheral device 404 is a USB connected device.

In an embodiment, the SST 400 is the ATM 110.

In an embodiment, the SST 400 is a kiosk or a POS terminal.

In an embodiment, the protect resource 402 is the app/device interface 111 or 131.

In an embodiment, the protected resource 402 is one of: an application process that is network-accessible from the SST 400, a peripherally-connected and integrated device that is network-accessible from the SST 400, and a file that is network-accessible from the SST 400.

In an embodiment, the IP address generator 403 is one of: the IP address generator 112, the IP address generator 132, the IP address generator 141, the method 200, and the method 300.

The IP address generator 403 is configured to: i) periodically and randomly generate a network address for accessing the protected resource 402 on the SST 400 over a network, ii) force an OS to map a process identifier for the protected resource 402 to a current randomly generated network address, iii) provide the currently randomly generated network address to a network router interfaced to the SST 400, and iv) provide network traffic addressed to the currently randomly generated network address over the network router to the protected resource 402 for processing.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining a seed value;
randomly generating a unique network address for a protected resource controlled by a device at predefined intervals of time based on the seed value;
synchronizing each unique network address with other devices permitted to access the protected resource based on independent processing on those other devices that utilize the seed value, the predefined intervals of time, a calendar day, and a time of day; and
dynamically pushing each unique network address to an Operating System (OS) network interface of the device when a last unique network address is changed at the predefined intervals of time, ensuring that network traffic directed to a particular unique network address from one of the other devices is properly delivered on the device to the protected resource, wherein dynamically pushing further includes disabling, by the OS network interface, port addressing network accessibility to the protected resource and other resources on the device.

2. The method of claim 1 further comprising, installing executable instructions representing the method in a non-transitory storage medium for execution by one or more processors of the device as an OS kernel set of software libraries.

3. The method of claim 1 further comprising, processing the method on a peripheral device that is interfaced to the device, wherein the peripheral device is one of: a Universal Serial Bus (USB) device and a Network Interface Card (NIC) for the device.

4. The method of claim 1, wherein obtaining further includes receiving the seed value through a secure interface of the method.

5. The method of claim 1, wherein randomly generating further includes randomly generating each unique network address within a predefined address range that is available for addressing resources from an Internet Protocol (IP) address of the device.

6. The method of claim 5, wherein randomly generating further identifying the IP address of the device as one of: an IP version 6 (IPv6) address and an IP version 4 (IPv4) address.

7. The method of claim 1, wherein randomly generating further includes randomly generating each unique network address within a predefined range of available port numbers on the device utilizing an Internet Protocol (IP) address of the device.

8. The method of claim 1, randomly generating further includes randomly generating each unique network address within a subnet range of available addressing space provided with an Internet Protocol (IP) version 6 (IP6) address of the device.

9. A method, comprising:
obtaining a seed value;
randomly generating a unique network address for a protected resource controlled by a device at predefined intervals of time based on the seed value;
synchronizing each unique network address with other devices permitted to access the protected resource based on independent processing on those other devices that utilize the seed value, the predefined intervals of time, a calendar day, and a time of day; and
dynamically pushing each unique network address to an Operating System (OS) network interface of the device when a last unique network address is changed at the predefined intervals of time, ensuring that network traffic directed to a particular unique network address from one of the other devices is properly delivered on the device to the protected resource of claim 1, wherein dynamically pushing further includes disabling, by the OS network interface, existing external network-addressing accessibility to the protected resource and other resources of the device.

* * * * *